US008382374B2

(12) United States Patent
Murata (10) Patent No.: US 8,382,374 B2
(45) Date of Patent: Feb. 26, 2013

(54) SEALING MEMBER FOR ROLLING DEVICE AND ROLLING DEVICE (75) Inventor: Tomozumi Murata, Tokyo (JP)

(73) Assignee: THK Co., Ltd., Tokyo (JP)

(*) Notice: Subject to any disclaimer, the term of this patent is extended or adjusted under 35 U.S.C. 154(b) by 694 days.

(21) Appl. No.: 12/532,881

(22) PCT Filed: Feb. 5, 2008

(86) PCT No.: PCT/JP2008/051809
§ 371 (c)(1),
(2), (4) Date: Sep. 24, 2009

(87) PCT Pub. No.: WO2008/120496
PCT Pub. Date: Oct. 9, 2008

(65) Prior Publication Data
US 2010/0158419 A1 Jun. 24, 2010

(30) Foreign Application Priority Data

Mar. 29, 2007 (JP) ................................. 2007-087985
Apr. 26, 2007 (JP) ................................. 2007-117447

(51) Int. Cl.
*F16C 29/06* (2006.01)
*F16C 33/00* (2006.01)
(52) U.S. Cl. .......................................... 384/15; 384/45
(58) Field of Classification Search ............... 384/15, 384/139, 140, 143, 144, 147, 477, 480, 484, 384/485, 486, 130; 277/353, 551, 562
See application file for complete search history.

(56) References Cited

U.S. PATENT DOCUMENTS

| 4,449,717 A | 5/1984 | Kitawaki et al. |
| 5,340,219 A | 8/1994 | Agari |
| 5,522,600 A * | 6/1996 | Duckwall ..................... 277/402 |
| 6,030,124 A * | 2/2000 | Moseberg et al. ............ 384/15 |
| 2003/0205445 A1 | 11/2003 | Kuwabara |
| 2006/0175762 A1* | 8/2006 | Barnett et al. ................ 277/551 |

FOREIGN PATENT DOCUMENTS

| FR | 2600741 A * | 12/1987 |
| JP | 58-068552 | 4/1983 |
| JP | 63-162129 | 10/1988 |
| JP | 3-118362 | 12/1991 |
| JP | 4-300423 | 10/1992 |
| JP | 5-231422 | 9/1993 |
| JP | 6-53821 | 7/1994 |
| JP | 2003-322151 | 11/2003 |

OTHER PUBLICATIONS

International Search Report—PCT/JP2008/051809—Mar. 4, 2008.

* cited by examiner

*Primary Examiner* — Phillip A Johnson
(74) *Attorney, Agent, or Firm* — Young & Thompson (57) ABSTRACT

A sealing member for a rolling device is applied to a rolling device with inner and outer members and a plurality of rolling members between so the rolling members can roll to allow relative rotational or linear movement of the outer member with respect to the inner member. The sealing member includes an inner and outer lip parts that press the inner and outer members, respectively. The outer lip part is less rigid than the inner lip part. The sealing member may have a substantially circular shape and surround the inner member. Alternatively, the sealing member may have a substantially plate-like shape and extend in a direction of relative movement of the outer member with respect to the inner member. The sealing member for a rolling device configured as described above and a rolling device provided with the sealing member can be adequately used even in a hostile environment.

14 Claims, 7 Drawing Sheets

SEALING MEMBER FOR ROLLING DEVICE AND ROLLING DEVICE

TECHNICAL FIELD

The present invention relates to a rolling device, such as a rolling bearing, a linear motion guide, a ball screw and a ball spline, and to an improvement of a sealing member for a rolling device that can be applied to the rolling device.

BACKGROUND ART

Known conventional rolling devices have an inner member, an outer member, and a plurality of rolling members, such as balls or rollers, that are disposed between the inner member and the outer member and endlessly circulate between a loaded section formed between the inner member and the outer member and an unloaded section formed on the outer member to allow relative rotational or linear movement of the outer member with respect to the inner member. The rolling devices of this type inherently have a gap between the inner member and the outer member because of its structure, and therefore, foreign matter can enter the gap from the outside in the course of relative slide between the inner member and the outer member. Besides, a lubricant is sometimes introduced into the inner member. In that case, the lubricant has to be prevented from leaking in the course of relative slide between the inner member and the outer member. Thus, the conventional rolling devices have a sealing member to prevent leakage of the lubricant from inside the inner member or entry of foreign matter from the outside.

Figure 9:
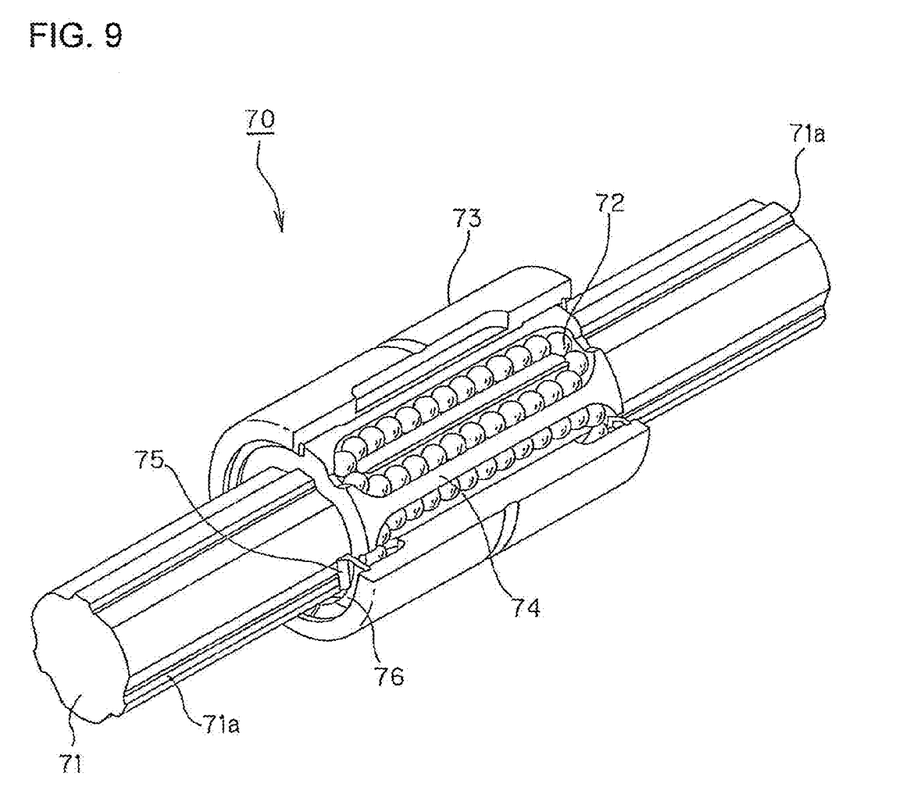
FIG. 9 is a partially cut away perspective view for illustrating the whole of the configuration of a ball spline.
Figure 10:
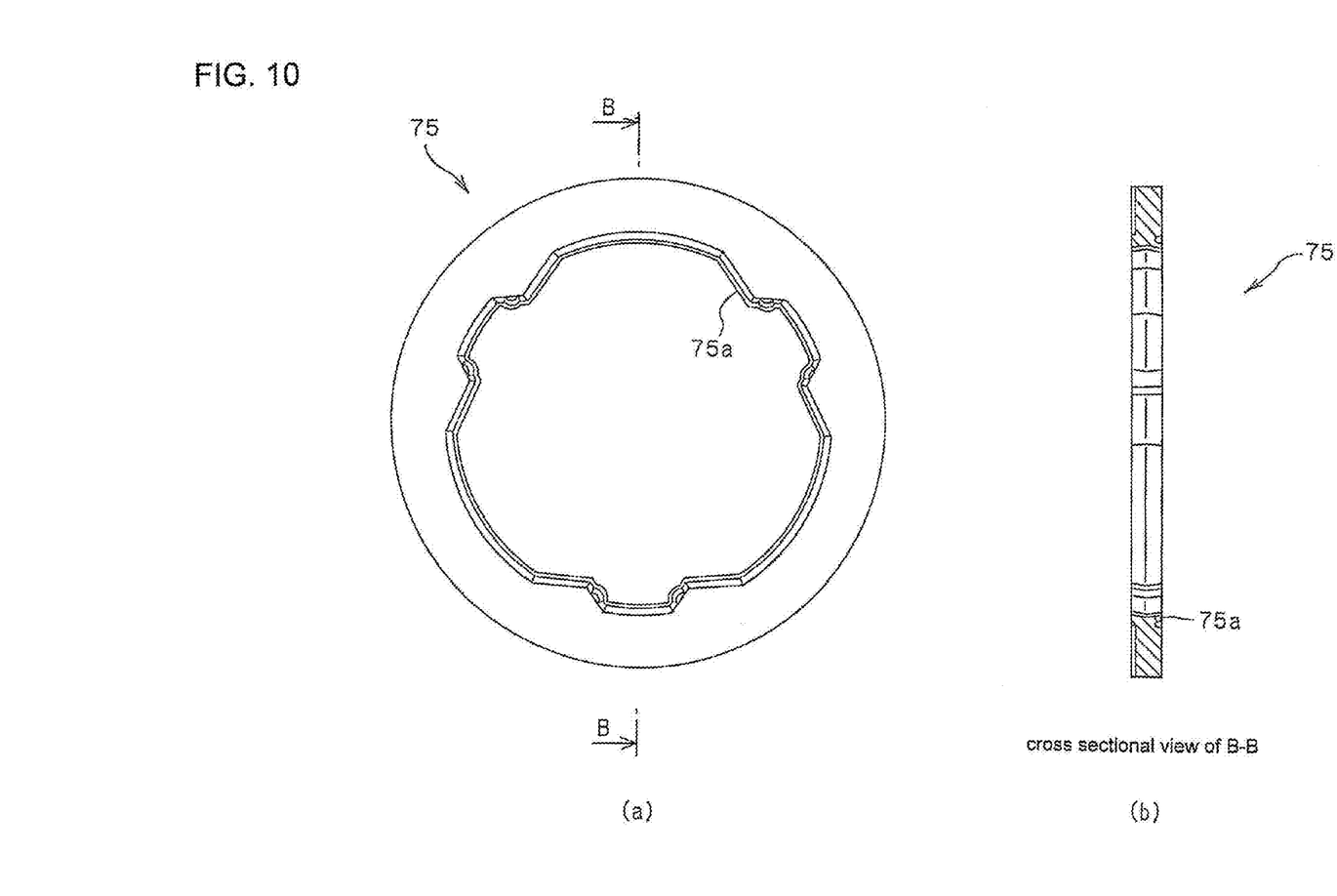

As an example of the conventional rolling devices having a sealing member, a ball spline will be described. FIG. 9 is a partially cut away perspective view for illustrating the whole of the configuration of a ball spline. FIG. 10 includes diagrams showing a conventional sealing member applied to the ball spline shown in FIG. 9. In particular, FIG. 10(*a*) is a front view of the conventional sealing member, and FIG. 10(*b*) is a cross-sectional view of the sealing member taken along the line B-B in FIG. 10(*a*).

A ball spline 70 shown in FIG. 9 has a spline shaft 71 serving as the inner member and a cylindrical outer sleeve 73 serving as the outer member movably attached to the spline shaft 71 with a plurality of balls 72 serving as rolling members interposed therebetween.

Grooves 71*a* for rolling members extending in the axial direction of the spline shaft 71 to serve as a track for the balls 72 are formed in the surface of the spline shaft 71. The outer sleeve 73 to be attached to the spline shaft 71 has grooves for loaded rolling members corresponding to the grooves 71*a* for rolling members. In the grooves for loaded rolling members, a plurality of linear protrusions extending in the direction of the grooves 71*a* for rolling members are formed.

Loaded paths are formed between the grooves for loaded rolling members formed in the outer sleeve 73 and the grooves 71*a* for rolling members formed in the spline shaft 71. Unloaded return paths through which unloaded balls 72 moves are formed adjacent to the loaded paths. The outer sleeve 74 has a holder 74 to arrange and maintain the plurality of balls 72 in a circuit configuration.

The plurality of balls 72 are disposed in the loaded paths between the grooves for loaded rolling members formed in the outer sleeve 73 and the grooves 71*a* for rolling members formed in the spline shaft 71 and in the unloaded return paths in such a manner that the balls 72 can endlessly circulate between the loaded paths and the unloaded paths. Thus, the outer sleeve 73 can relatively move back and forth with respect to the spline shaft 71.

Furthermore, to seal the gap between the spline shaft 71 and the outer sleeve 73, the spline 70 has a conventional sealing member 75. The conventional sealing member 75 is fixed by fitting the sealing member 75 and a retaining ring 76 into an annular groove formed in the inner periphery of the outer sleeve 73 and prevents leakage of the lubricant from inside the outer sleeve 73 or entry of foreign matter from the outside.

The sealing member 75 of this type is disclosed in the Patent Document 1 described, for example. Any conventional sealing member of this type is fitted into the groove formed in the outer member with a retaining ring.

Patent Document 1: Japanese Patent Laid-Open No. 4-300423

DISCLOSURE OF THE INVENTION

Problems to be Solved by the Invention

In recent years, demands for a rolling device that can be used in any environment have been growing in industry. However, as specifically shown in FIG. 10, the conventional sealing member 75 only has a lip part 75*a* for sealing on the interface with the inner member, specifically, the spline shaft 71, and is not designed for sealing at the interface with the outer sleeve 73. In particular, the conventional sealing member 75 is fitted into the annular groove formed in the inner periphery of the outer sleeve 73 with the retaining ring 76, so that play is provided in the groove into which the sealing member is fitted in order to facilitate attachment.

If the sealing member 75 configured as described above is used in a hostile environment filled with solid foreign matter, such as dust, or liquid foreign matter, such as coolant, the dust, coolant or the like can enter the inside of the outer sleeve 73 to hinder appropriate back-and-forth movement of the rolling device. Thus, the conventional rolling device is subject to constraints on the usage environment and cannot adequately meet the industrial or other demand for a wide applicability of the rolling device.

The present invention has been made in view of the problems described above, and an object of the present invention is to provide a rolling device in which a gap between an inner member and an outer member is surely sealed so that the rolling device can be adequately used even in a hostile environment filled with dust, coolant or the like, and a sealing member for a rolling device that can be applied to the rolling device.

Means for Solving the Problems

A sealing member for a rolling device according to the present invention is a sealing member for a rolling device applied to a rolling device that has an inner member, an outer member, and a plurality of rolling members disposed between the inner member and the outer member in such a manner that the rolling members are capable of rolling to allow relative rotational or linear movement of the outer member with respect to the inner member and is characterized in that the sealing member comprises an inner lip part that presses the inner member and an outer lip part that presses the outer member.

In the sealing member for a rolling device according to the present invention, the outer lip part may have a lower rigidity than the inner lip part.

In the sealing member for a rolling device according to the present invention, the outer lip part may have substantially V-shaped cross section and be arranged in such a manner that a tip end of the substantially V shape in contact with the outer member points in an outward direction viewed from the outer member.

In the sealing member for a rolling device according to the present invention, the outer lip part may have a substantially W-shaped cross section and be arranged in such a manner that a tip end of the substantially W shape in contact with the outer member points in an outward direction viewed from the outer member.

In the sealing member for a rolling device according to the present invention, the outer lip part may have a substantially semi-circular cross section.

The sealing member for a rolling device according to the present invention described above may have a plurality of outer lip parts.

In the sealing member for a rolling device according to the present invention, the material forming the outer lip part may have a lower modulus of elasticity than the material forming the inner lip part.

The sealing member for a rolling device according to the present invention may have a substantially circular shape and surround the inner member.

The sealing member for a rolling device according to the present invention may have a substantially plate-like shape and extend in a direction of relative movement of the outer member with respect to the inner member.

A rolling device according to the present invention is a rolling device that comprises an inner member, an outer member, and a plurality of rolling members disposed between the inner member and the outer member in such a manner that the rolling members are capable of rolling to allow relative rotational or linear movement of the outer member with respect to the inner member and is characterized in that the rolling device further comprises a sealing member that seals a gap between the inner member and the outer member, the sealing member has an inner lip part that presses the inner member and an outer lip part that presses the outer member, and the outer lip part has a lower rigidity than the inner lip part.

In the rolling device according to the present invention, the sealing member may have a substantially circular shape and surround the inner member.

In the rolling device according to the present invention, the sealing member may have a substantially plate-like shape and extend in a direction of relative movement of the outer member with respect to the inner member.

The above summary of the present invention does not include all the required characteristics of the present invention, but the present invention also includes sub-combinations of the characteristics described above.

Effects of the Invention

According to the present invention, the gap between the inner member and the outer member can be surely sealed, and thus, a rolling device that can be adequately used even in a hostile environment filled with dust, coolant or the like and a sealing member for a rolling device that can be applied to the rolling device can be provided.

BRIEF DESCRIPTION OF THE DRAWINGS

FIG. 1 includes diagrams showing a sealing member for a rolling device according to a first embodiment, in which FIG. 1(a) is a front view of the sealing member for a rolling device according to the first embodiment, and FIG. 1(b) is a cross-sectional view of the sealing member taken along the line A-A in FIG. 1(a);

FIG. 3 includes diagrams showing a sealing member for a rolling device according to a second embodiment, in which FIG. 3(a) is a front view of the sealing member for a rolling device according to the second embodiment, FIG. 3(b) is a top view of the sealing member for a rolling device according to the second embodiment, and FIG. 3(c) is a side view of the sealing member for a rolling device according to the second embodiment;

FIG. 10 includes diagrams showing a conventional sealing member applied to the ball spline shown in FIG. 9, in which FIG. 10(a) is a front view of the conventional sealing member, and FIG. 10(b) is a cross-sectional view of the sealing member taken along the line 2-B in FIG. 10(a).

REFERENCE NUMERALS 10 sealing member
11 inner lip part
11a dust lip part
11b oil lip part
15 outer lip part
15a outer lip part
16 bolt hole
20 sealing member
21 inner lip part
21a dust lip part
21b oil lip part
25 outer lip part
29 notches
30 linear guide
31 track rail
32 movable block
70 ball spline
71 spline shaft
71a groove
72 ball
73 outer sleeve
75 sealing member
76 retaining ring

MODE FOR CARRYING OUT THE INVENTION

In the following, preferred embodiments of the present invention will be described with reference to the drawings.

Note that the embodiments described below are not intended to limit the present invention described in the claims, and all the characteristics of the present invention described in the following embodiments do not always have to be combined to attain the object of the present invention.

[First Embodiment]

Figure 1:
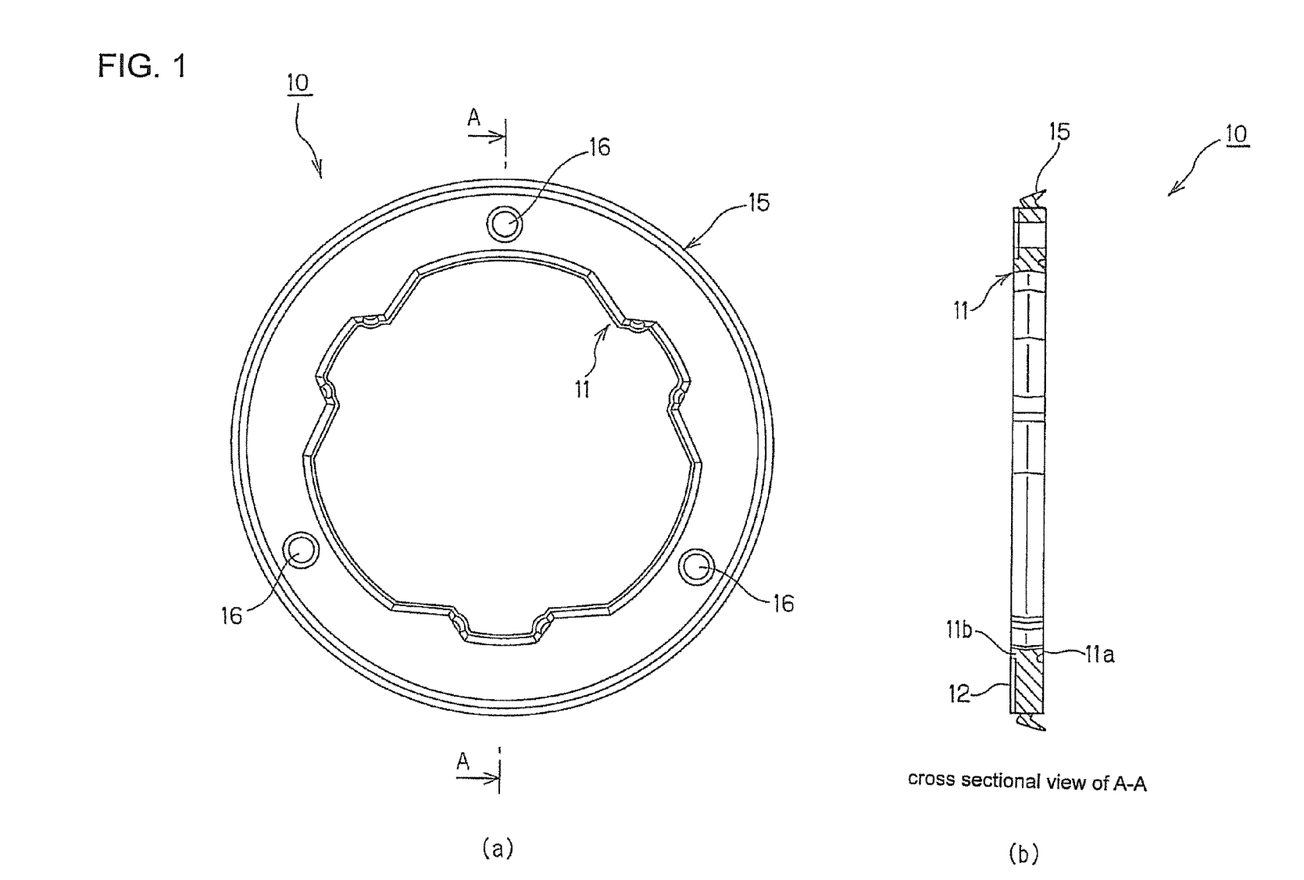
Figure 2:
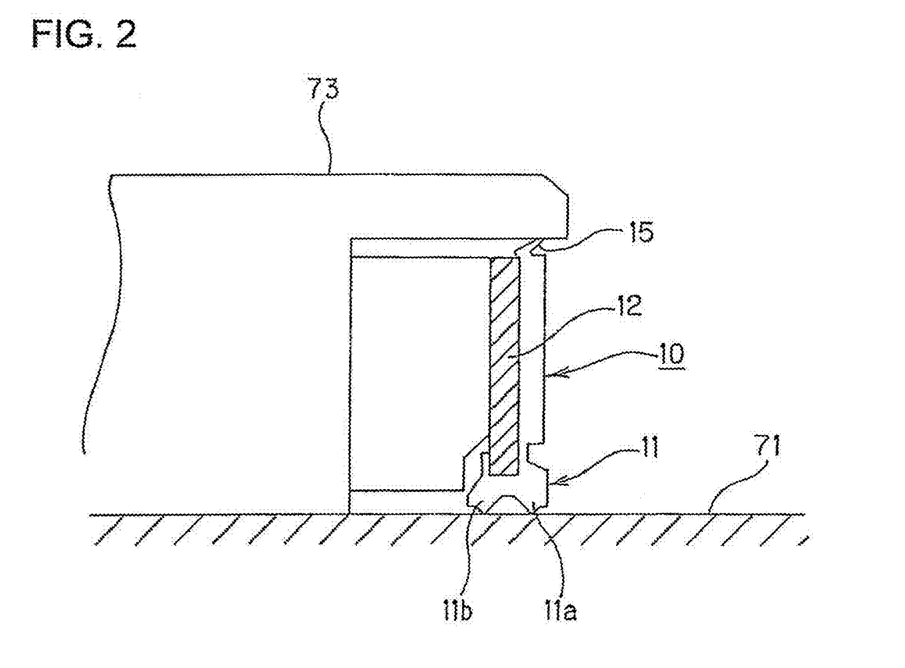
FIG. 2 is an enlarged cross-sectional view of essential parts of the sealing member for a rolling device according to the first embodiment for illustrating an operation thereof.

FIG. 1 is a diagram showing a sealing member 10 for a rolling device according to a first embodiment. In particular, FIG. 1(a) is a front view of the sealing member 10 for a rolling device according to the first embodiment, and FIG. 1(b) is a cross-sectional view of the sealing member 10 for a rolling device taken along the line A-A in FIG. 1(a). FIG. 2 is an enlarged cross-sectional view of essential parts of the sealing member 10 for a rolling device according to the first embodiment for illustrating an operation thereof. The sealing member 10 for a rolling device according to the first embodiment shown in FIG. 1 is an example of a sealing member for a rolling device that can be applied to a ball spline 70 illustrated in FIG. 9. Parts identical or similar to those described in Background Art are denoted by the same reference numerals, and descriptions thereof will sometimes be omitted.

The sealing member 10 for a rolling device according to the first embodiment is characterized in that the sealing member 10 has an inner lip part 11 formed on the inner periphery of the sealing member 10 to press a spline shaft 71, which is an inner member, as well as an outer lip part 15 to press an outer sleeve 73, which is an outer member.

More specifically, the sealing member 10 for a rolling device according to the first embodiment is formed by integrating a plastic member made of a rubber material, a synthetic resin material or the like and formed by vulcanization molding, injection molding or the like with an annular-shaped metal mount 12 made of a metal material.

The inner lip part 11 pressing the spline shaft 71 has a dust lip part 11a extending in an outward direction viewed from the outer sleeve 73, and the dust lip part 11a serves a function of surely preventing entry of dust, coolant or the like from the outside. The inner lip part 11 further has an oil lip part 11b extending in an inward direction viewed from the outer sleeve 73. The oil lip part 11b serves a function of preventing leakage of a lubricant from inside the outer sleeve 73 to the outside.

As shown in FIGS. 1 and 2, the outer lip part 15 pressing the outer sleeve 73 has a substantially V-shaped cross section and is arranged in such a manner that the tip end of the V shape in contact with the outer sleeve 73 points in an outward direction viewed from the outer member. The arrangement ensures that the outer lip part 15 prevents entry of foreign matter, such as dust and coolant, into the outer sleeve 73 from the outside.

The sealing member 10 for a rolling device according to the first embodiment is further characterized in that the outer lip part 15 has a lower rigidity than the inner lip part 21. Since the inner lip part 11 has a higher rigidity than the outer lip part 15, centering of the sealing member 10 for a rolling device is achieved on the inner lip part 11 having a higher rigidity. In addition, for the sealing member 10 for a rolling device, a higher load is applied to the inner lip part 11 because of the relative movement of the outer sleeve 73 with respect to the spline shaft 71. Thus, centering the sealing member 10 on the inner lip part 11 as described above leads to an increase of the pressing force of the inner lip part 11 subject to the higher load, and therefore, sealing between the spline shaft 71 and the outer sleeve 73 can be more surely achieved.

In the sealing member 10 for a rolling device according to the first embodiment having the advantageous characteristics described above, the dust lip part 11a of the inner lip part 11 serves to surely prevent entry of solid foreign matter, such as dust, dirt and contaminant, which would otherwise be commonly found between the spline shaft 71 and the outer sleeve 73, from the outside, and the oil lip part 11b of the inner lip part 11 serves to surely prevent leakage of the lubricant, such as grease and oil, introduced to the interior of the outer sleeve 73 to maintain the lubricant. Furthermore, the outer lip part 15 serves to surely prevent entry of liquid foreign matter, such as coolant, which would otherwise commonly enter the inside of the outer sleeve 73, into the outer sleeve 73. Of course, the dust lip part 11a of the inner lip part 11 and the outer lip part 15 can adequately serve the sealing function regardless of whether the state of the foreign matter is solid or liquid and can prevent entry of any forms of external foreign matter.

Although the outer lip part 15 has a lower rigidity than the inner lip part 11, the outer lip part 15 can adequately serve the function thereof, and sealing or packing of the outer sleeve 73 by the outer lip part 15 is not compromised.

The sealing member 10 for a rolling device according to the first embodiment is fixed to the outer sleeve 73 with a bolt hole 16 formed in the periphery thereof, and therefore, a groove into which the sealing member is fitted, which is needed according to the prior art, does not have to be formed in the outer sleeve 73. The threaded fixing using a bolt and the bolt hole 16 is a fastening device remarkably superior in fixing force to the conventional fitting fixing. Furthermore, the interface between the outer sleeve 73 and the sealing member 10 for a rolling device is surely sealed by the outer lip part 15 that is provided with sealing and packing capabilities by the substantially V-shaped cross section. Therefore, the sealing member 10 for a rolling device according to the first embodiment can highly steadily serve a sealing function compared with the prior art.

The sealing member 10 for a rolling device according to the first embodiment that can be suitably applied to the ball spline 70 has been described. The sealing member 10 for a rolling device according to the first embodiment is arranged to surround the inner member or, specifically, the spline shaft 71, and therefore, the sealing member 10 is characterized in that it has a substantially circular shape. However, the shape of the sealing member for a rolling device according to the present invention is not limited to the substantially circular shape described in the first embodiment. Next, a sealing member for a rolling device according to the present invention, which can be suitably applied to a linear guide serving as a rolling device, will be described.

[Second Embodiment]

Figure 3:
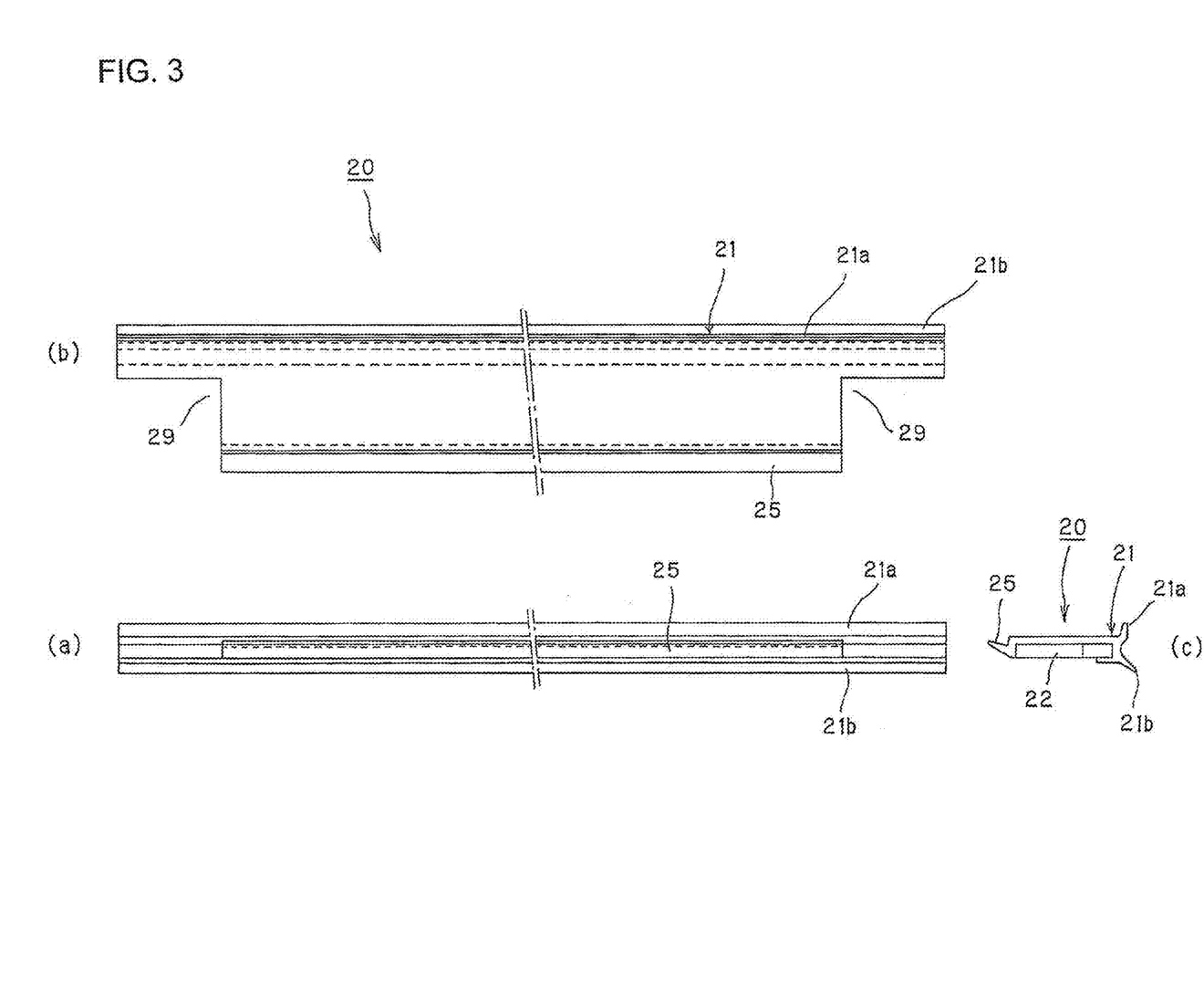
Figure 4:
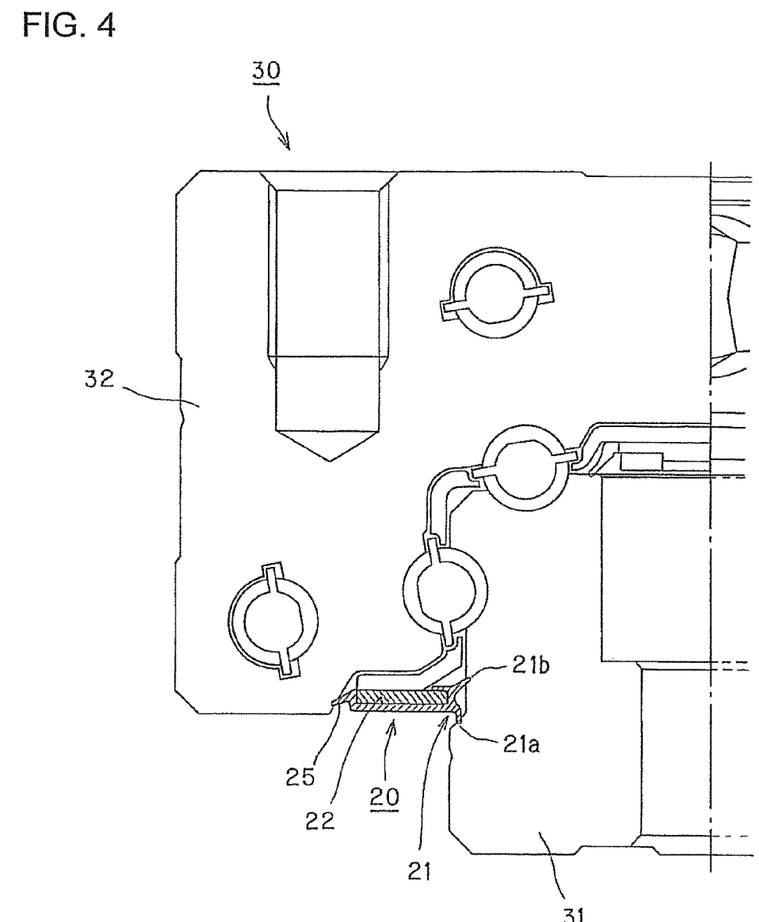
FIG. 4 is a vertical cross-sectional view for illustrating a configuration of a linear guide to which the sealing member for a rolling device according to the second embodiment is applied.

FIG. 3 is a diagram showing a sealing member 20 for a rolling device according to a second embodiment. In particular, FIG. 3(a) is a front view of the sealing member 20 for a rolling device according to the second embodiment, FIG. 3(b) is a top view of the sealing member 20 for a rolling device according to the second embodiment, and FIG. 3(c) is a side view of the sealing member 20 for a rolling device according to the second embodiment. FIG. 4 is a vertical cross-sectional view of a linear guide 30 to which the sealing member 20 for a rolling device according to the second embodiment is applied. For the sake of simplicity of illustration, FIG. 4 shows only a left half of the vertical cross section of the linear guide 30.

Unlike the sealing member 10 for a rolling device according to the first embodiment that has a substantially circular shape, the sealing member 20 for a rolling device according to the second embodiment is characterized in that the sealing member has a substantially plate-like shape. The sealing member 20 for a rolling device according to the second embodiment has the substantially plate-like shape in order to serve as a side seal for the linear guide 30. Specifically, as shown in FIG. 4, the sealing member 20 for a rolling device according to the second embodiment is installed between a track rail 31, which is an inner member, and a movable block 32, which is an outer member, and has a substantially plate-like shape extending in the direction of relative linear movement of the outer member (movable block 32) with respect to the inner member (track rail 31). Thus, the sealing member 20 for a rolling device according to the second embodiment can surely prevent entry of foreign matter, such as dust and coolant, into the gap between the track rail 31, which is the inner member, and the movable block 32, which is the outer member, from the side surface of the linear guide 30.

Next, a specific configuration of the sealing member 20 for a rolling device according to the second embodiment will be described. As shown in FIGS. 3 and 4, the sealing member 20 for a rolling device according to the second embodiment has an inner lip part 21 formed on the inner periphery of the sealing member 20 to press the track rail 31, which is the inner member, as well as an outer lip part 25 to press the movable block 32, which is the outer member.

The inner lip part 21 pressing the track rail 31 has a dust lip part 21a extending in a direction toward the bottom of the track rail 31, and the dust lip part 21a serves a function of surely preventing entry of dust, coolant or the like from the outside. The inner lip part 21 further has an oil lip part 21b extending in a direction toward the top of the track rail 31. The oil lip part 21b serves a function of preventing leakage of a lubricant from inside the movable block 32 to the outside.

The outer lip part 25 pressing the movable block 32 has a substantially V-shaped cross section and is arranged in such a manner that the tip end of the V shape in contact with the movable block 32 points in an outward direction viewed from the movable block 32 or, in other words, in a direction toward the bottom of the movable block 32. The arrangement ensures that the outer lip part 25 prevents entry of foreign matter, such as dust and coolant, into the movable block 32 from the outside.

The sealing member 20 for a rolling device according to the second embodiment is manufactured in substantially the same manner as the sealing member 10 for a rolling device according to the first embodiment described above. The sealing member 20 for a rolling device according to the second embodiment is formed by integrating a plastic member made of a rubber material, a synthetic resin material or the like and formed by vulcanization molding, injection molding or the like with a plate-like metal mount 22 made of a metal material.

For the sealing member 20 for a rolling device according to the second embodiment, as with the sealing member 10 for a rolling device according to the first embodiment described above, the outer lip part 25 has a lower rigidity than the inner lip part 21. As in the first embodiment, this ensures that sealing performance is improved due to the increase of the pressing force of the inner lip part 21 to which a higher load is applied, the packing performance of the outer lip part 25 is improved, and the gap between the track rail 31 and the movable block 32 is surely sealed and packed.

The sealing member 20 for a rolling device according to the second embodiment has notches on the opposite ends as shown in FIG. 3(b). The notches 29 are intended to facilitate attachment to end plates (not shown) installed at the opposite ends of the movable block 32, and the sealing performance is ensured by fitting the end plates (not shown) into the notches 29. In addition, the sealing of the linear guide 30 is improved by eliminating the gap between the sealing member 20 for a rolling device according to the second embodiment and a well-known end seal (not shown) provided on the end plates.

Attachment of the sealing member 20 for a rolling device according to the second embodiment can be achieved in any way. For example, a linear groove may be formed in the movable block 32, and the sealing member 20 for a rolling device may be fitted into the groove. Alternatively, the sealing member 20 for a rolling device may be fixed to the movable block 32 with a bolt. Regardless of the way of attachment, the sealing member 20 for a rolling device according to the second embodiment can adequately serve the sealing function and the packing function.

Sealing members for a roiling device according to preferred embodiments of the present invention have been described. However, the technical scope of the present invention is not limited to the scopes of the embodiments described above, and various modifications and alterations can be made.

Figure 5:
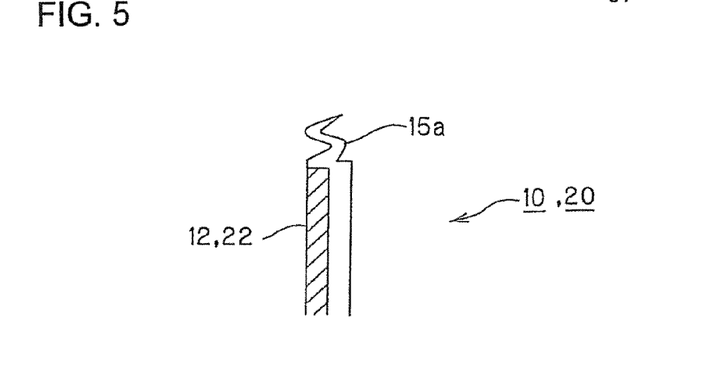
FIG. 5 is a diagram showing an exemplary one of various modifications of an outer lip part according to the present invention.

For example, the cross section of the outer lip part 15, 25 is not limited to the substantially V shape shown in FIGS. 1 to 4. For example, an outer lip part 15a that has substantially W-shaped cross section and is arranged in such a manner that the tip end of the substantially W shape in contact with the outer member points in an outward direction viewed from the outer member as shown in FIG. 5 can be used. The outer lip part 15a having the substantially W-shaped cross section has a higher flexibility than the outer lip part having the substantially V-shaped cross section and therefore is useful when the dimension of the gap between the inner member and the outer member is roughly measured.

Figure 6:
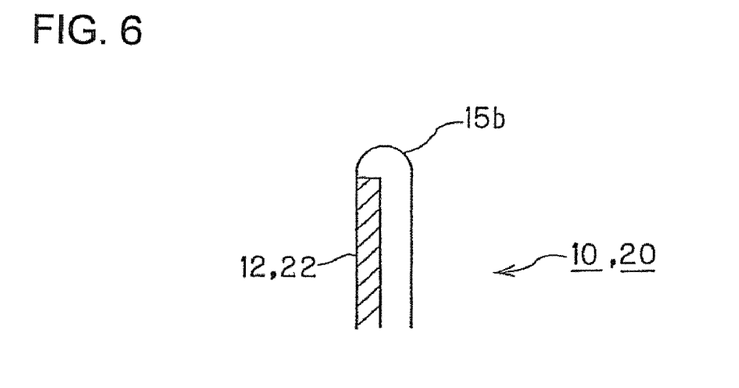
FIG. 6 is a diagram showing another exemplary one of various modifications of the outer lip part according to the present invention.

Alternatively, as shown in FIG. 6, the outer lip part may have a substantially semi-circular cross section. An outer lip part 15b having a substantially semi-circular cross section is less complicated in shape than the outer lip parts 15, 15a and 25 described above and therefore can be manufactured at lower cost.

Figure 7:
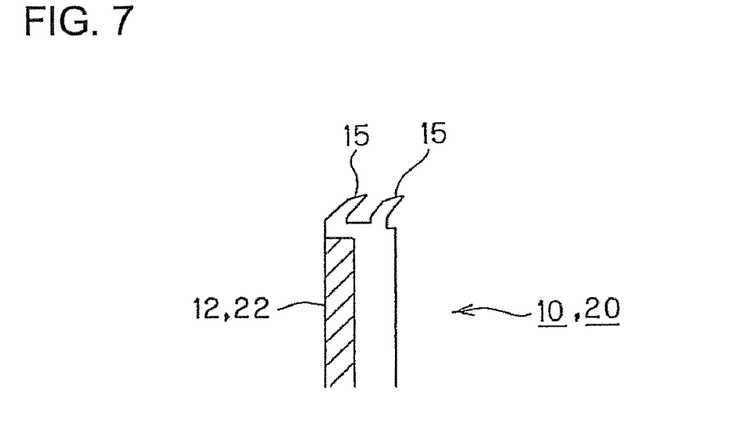
FIG. 7 is a diagram showing another exemplary one of various modifications of the outer lip part according to the present invention.

Furthermore, regardless of the type of the outer lip part 15, 15a, 15b or 25, a plurality of outer lip parts can be provided. For example, as shown in FIG. 7, two outer lip parts 15 having the substantially V-shaped cross section can be provided to further improve the sealing performance of the sealing member for a rolling device.

Figure 8:
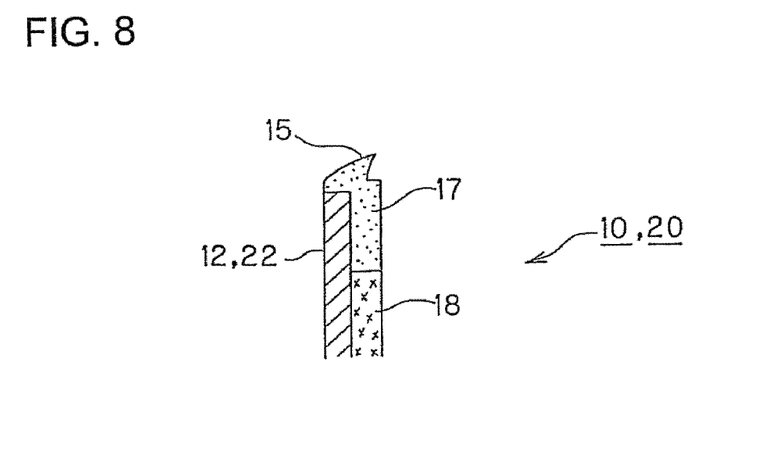
FIG. 8 is a diagram showing an exemplary one of various modifications of the sealing member for a rolling device according to the present invention.

The characteristic of the sealing member for a rolling device according to the present invention that the outer lip part has a lower rigidity than the inner lip part can be achieved by making the inner lip part and the outer lip part of different materials, instead of shaping the outer lip part differently from the inner lip part. More specifically, as shown in FIG. 8, in manufacturing the sealing member for a rolling device, the outer lip part 15, 25 may be made of a material having a lower modulus of elasticity than the material of the inner lip part 11, 21. For example, the outer lip part 15, 25 can have a lower rigidity than the inner lip part 11, 21 if the inner lip part 11, 21 is made of a hard material 18 having a high Young's modulus, and the outer lip part 15, 25 is made of a soft material 17 having a low Young's modulus. In this way, the steady sealing performance of the sealing member for a rolling device according to the present invention can be achieved by using different materials for the inner and outer lip parts.

In the embodiments described above, the sealing members for a rolling device according to the present invention are applied to the ball spline 70 or the linear guide 30, for example. However, the rolling device according to the present invention to which the sealing member for a rolling device according to the present invention can be applied is not limited to the ball spline 70 and the linear guide 30 and may be any type of device that involves a rolling or sliding operation, such as rolling bearings used in machine tools, non-lubricant bearings used in a vacuum, linear motion guides, ball screws and ball bushings. The shape of the sealing member for a rolling device according to the present invention is not limited to the substantially circular shape and the substantially plate-like shape described above but can be arbitrarily altered depending on the shape of the rolling device without modifying the characteristics of the present invention.

As can be apparently seen from the description of the claims, embodiments modified or improved as described, above are also included in the technical scope of the present invention.

The invention claimed is:

1. A sealing member for a rolling device, the rolling device having an inner member, an outer member, and a plurality of rolling members disposed between said inner member and said outer member in such a manner that the rolling members are capable of rolling to allow relative rotational or linear movement of said outer member with respect to said inner member, characterized in that the sealing member comprises:
    an inner lip part that presses said inner member; and
    an outer lip part that presses said outer member,
        wherein said outer lip part has a lower rigidity than said inner lip part,
        said inner lip part is in sliding contact with said inner member, and
        said sealing member is fixed to said outer member.

2. The sealing member for the rolling device according to claim 1, wherein said outer lip part has a substantially V-shaped cross section and is arranged in such a manner that a tip end of said substantially V shape in contact with said outer member points in an outward direction viewed from said outer member.

3. The sealing member for the rolling device according to claim 2, wherein the sealing member has a plurality of outer lip parts.

4. The sealing member for the rolling device according to claim 1, wherein said outer lip part has a substantially semicircular cross section.

5. The sealing member for the rolling device according to claim 4, wherein the sealing member has a plurality of outer lip parts.

6. The sealing member for the rolling device according to claim 1, wherein the sealing member has a plurality of outer lip parts.

7. The sealing member for the rolling device according to claim 1, wherein the sealing member has a substantially circular shape and surrounds said inner member.

8. The sealing member for the rolling device according to claim 1, wherein the sealing member has a substantially plate shape and extends in a direction of relative movement of said outer member with respect to said inner member.

9. A sealing member for a rolling device, the rolling device having an inner member, an outer member, and a plurality of rolling members disposed between said inner member and said outer member in such a manner that the rolling members are capable of rolling to allow relative rotational or linear movement of said outer member with respect to said inner member, characterized in that the sealing member comprises:
    an inner lip part that presses said inner member; and
    an outer lip part that presses said outer member,
        wherein said outer lip part has a substantially W-shaped cross section and is arranged in such a manner that a tip end of said substantially W shape in contact with said outer member points in an outward direction viewed from said outer member.

10. The sealing member for the rolling device according to claim 9, wherein the sealing member has a plurality of outer lip parts.

11. A sealing member for a rolling device, the rolling device having an inner member, an outer member, and a plurality of rolling members disposed between said inner member and said outer member in such a manner that the rolling members are capable of rolling to allow relative rotational or linear movement of said outer member with respect to said inner member, characterized in that the sealing member comprises:
    an inner lip part that presses said inner member; and
    an outer lip part that presses said outer member,
        wherein the material forming said outer lip part has a lower modulus of elasticity than the material forming said inner lip part,
        said inner lip part is in sliding contact with said inner member, and
        said sealing member is fixed to said outer member.

12. A rolling device, comprising:
    an inner member;
    an outer member; and
    a plurality of rolling members disposed between said inner member and said outer member in such a manner that the rolling members are capable of rolling to allow relative rotational or linear movement of said outer member with respect to said inner member,
    characterized in that the rolling device further comprises a sealing member that seals a gap between said inner member and said outer member,
    said sealing member has:
    an inner lip part that presses said inner member,
    an outer lip part that presses said outer member,
    said outer lip part has a lower rigidity than said inner lip part,
    said inner lip part is in sliding contact with said inner member, and
    said sealing member is fixed to said outer member.

13. The rolling device according to claim 12, wherein said sealing member has a substantially circular shape and surrounds said inner member.

14. The rolling device according to claim 12, wherein said sealing member has a substantially plate shape and extends in a direction of relative movement of said outer member with respect to said inner member.

* * * * *

UNITED STATES PATENT AND TRADEMARK OFFICE
CERTIFICATE OF CORRECTION

| | | |
|---|---|---|
| PATENT NO. | : | 8,382,374 B2 |
| APPLICATION NO. | : | 12/532881 |
| DATED | : | February 26, 2013 |
| INVENTOR(S) | : | Tomozumi Murata |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 696 days.

Signed and Sealed this

First Day of September, 2015

Michelle K. Lee
*Director of the United States Patent and Trademark Office*